(12) United States Patent
Kuroda et al.

(10) Patent No.: US 6,585,165 B1
(45) Date of Patent: Jul. 1, 2003

(54) IC CARD HAVING A MICA CAPACITOR

(75) Inventors: Nobukazu Kuroda, Kanuma (JP); Kazuaki Suzuki, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/763,453

(22) PCT Filed: Jun. 21, 2000

(86) PCT No.: PCT/JP00/04035
§ 371 (c)(1),
(2), (4) Date: Feb. 23, 2001

(87) PCT Pub. No.: WO01/01342
PCT Pub. Date: Jan. 4, 2001

(30) Foreign Application Priority Data

Jun. 29, 1999 (JP) .............................. 11-184477
Jan. 14, 2000 (JP) ....................... 2000-010237

(51) Int. Cl.⁷ ................................ G06K 19/06
(52) U.S. Cl. ....................... 235/492; 235/487
(58) Field of Search ................. 235/492, 380, 235/487, 488; 361/737, 148

(56) References Cited

U.S. PATENT DOCUMENTS

| | | | |
|---|---|---|---|
| 4,381,327 A | * 4/1983 | Briere | 428/137 |
| 5,088,003 A | * 2/1992 | Sakai et al. | 361/330 |
| 5,350,413 A | * 9/1994 | Miller | 607/61 |
| 5,852,289 A | * 12/1998 | Masahiko | 235/492 |
| 6,373,708 B1 | * 4/2002 | Ando et al. | |

FOREIGN PATENT DOCUMENTS

| | | |
|---|---|---|
| JP | 57-209578 | 12/1982 |
| JP | 58-78318 | 5/1983 |
| JP | 61-90231 | 5/1986 |
| JP | 1-127393 | 5/1989 |
| JP | 2-52498 | 2/1990 |
| JP | 8-287208 | 11/1996 |
| JP | 10-203060 | 8/1998 |
| JP | 2000-48153 | 2/2000 |

* cited by examiner

Primary Examiner—Daniel St. Cyr
(74) Attorney, Agent, or Firm—Oliff & Berridge, PLC

(57) ABSTRACT

An IC card 10A has a mica capacitor 5, an antenna coil 2 and an IC chip 3 formed on an insulating substrate 1, where the mica capacitor is composed of a mica film 6 and electrodes 7a and 7b formed on both sides of the mica film 6. terminal of the electrode 7b on one side of the mica capacitor 5 is formed on the other side of the mica capacitor 5, and this terminal and a terminal of the electrode 7a on the other side are connected on the insulating substrate 1 with the use of an anisotropic conductive adhesive 4. Thus, an IC card can be manufactured at low cost, in which the resonance frequency is stabilized and the antenna characteristics are improved.

12 Claims, 10 Drawing Sheets

IC CARD HAVING A MICA CAPACITOR

TECHICAL FIELD

The present invention relates to a contactless IC card for RFID (Radio Frequency Identification) or the like.

BACKGROUND ART

Data carrier systems have become widespread, in which an interrogating device (reader/writer) contactlessly induces a voltage in the antenna coil of a responding device (contactless IC card) to send and receive signals.

As shown in FIG. 16, the basic circuit elements of such a contactless IC card are an IC chip and a resonance circuit that is composed of an antenna coil and a capacitor, so that a specific configuration is to arrange the antenna coil, the capacitor and the IC chip on a substrate.

Formerly, rings of thin metal wires that are wound in one plane were used for the antenna coil, but recently, a conductive layer of copper foil or the like that is laminated on one side of an insulating substrate is etched into rings, which improves the antenna characteristics and the mechanical strength and reduces the number of parts to be assembled. Moreover, the insulating substrate on which the antenna coil is etched is used as the dielectric for the capacitor. That is to say, the antenna coil and the capacitor are formed by etching the conductive layer of a laminated board, in which conductive layers are formed on both sides of an insulating substrate.

In this case, a polyimide film is used for the insulating substrate. Furthermore, copper foil adhered with an adhesive, or a copper layer formed, for example, by sputtering is used for the conductive layer.

However, polyimide has a high water absorption rate and its dielectric constant changes as it absorbs moisture, so that the capacitance of a capacitor with a polyimide film as a dielectric changes as it absorbs moisture, and there is the problem that the resonance frequency of the IC card shifts.

In particular, laminated boards in which a polyimide film and a copper foil are adhered to one another with an adhesive have the advantage that they can be obtained at lower cost than those in which a copper layer is sputtered onto the polyimide film, but the resonance frequency of the IC card becomes even more unstable, because the adhesive becomes another cause of changes of the dielectric constant, in addition to the polyimide film.

It is an object of the present invention to solve these problems of the related art, and to provide an IC card with stable resonance frequency and improved antenna characteristics, which can be manufactured at low cost.

DISCLOSURE OF THE INVENTION

The inventors have found that using a mica capacitor having a mica film as a dielectric stabilizes the resonance frequency of the IC card, because the water absorption rate of the mica film is very low, and that putting the terminals of the electrodes on both sides of the mica film together on one side by means of a through-hole, the mica capacitor can be mounted at low cost and with high reliability on a substrate using an anisotropic conductive adhesive; and based on these findings, the present inventors have completed the present invention.

Thus, the present invention provides an IC card having a mica capacitor, an antenna coil and an IC chip formed on a substrate, the mica capacitor being made of a mica film and electrodes formed on both sides of the mica film, wherein a terminal of the electrode on one side of the mica capacitor is formed on the other side of the mica capacitor, and this terminal and a terminal of the electrode on the other side are connected on the substrate by an anisotropic conductive adhesive.

BRIEF DESCRIPTION OF THE DRAWINGS

FIG. 3A shows the forming of the antenna coil, FIG. 3B shows the mounting of the IC chip, and FIG. 3C shows the mounting of the mica capacitor.

BEST MODE FOR CARRYING OUT THE INVENTION

Figure 1A:
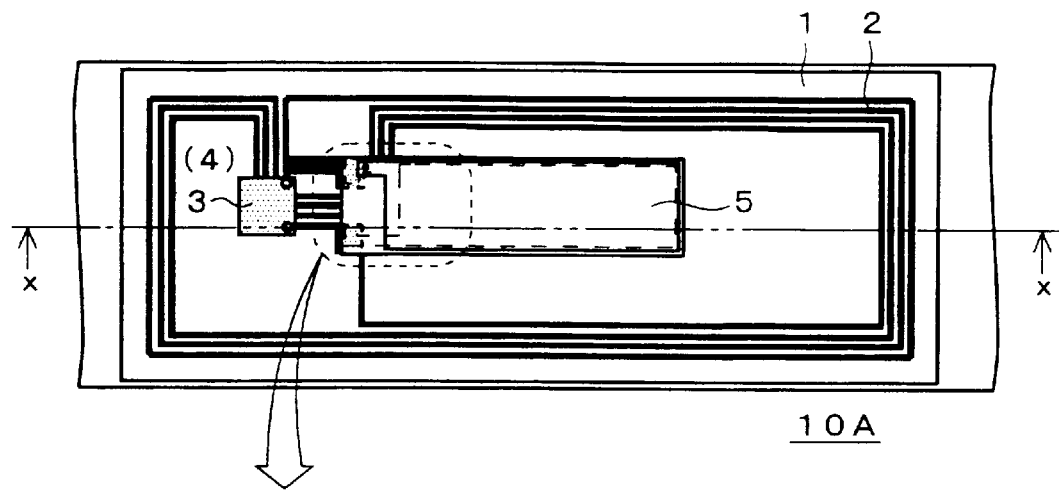
FIGS. 1A and 1B show a plane view and a cross-sectional view along x-x of an IC card in accordance with the present invention, respectively.

The following is a detailed description of the present invention, with reference to the accompanying drawings. In the drawings, like numerals are used to denote like or equivalent structural elements.

Figure 1A:
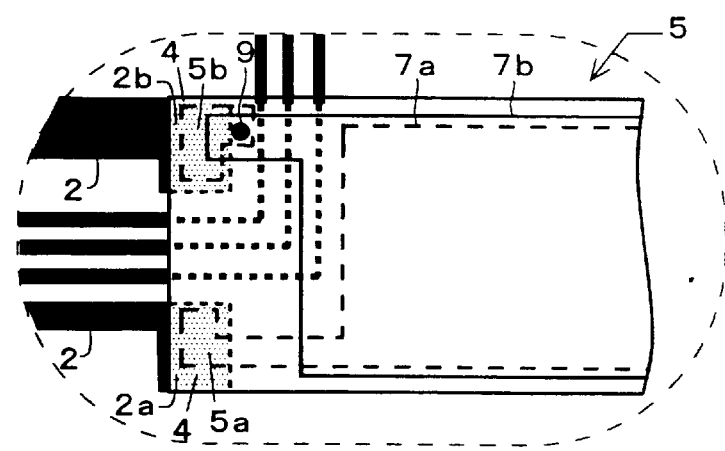
Figure 1B:
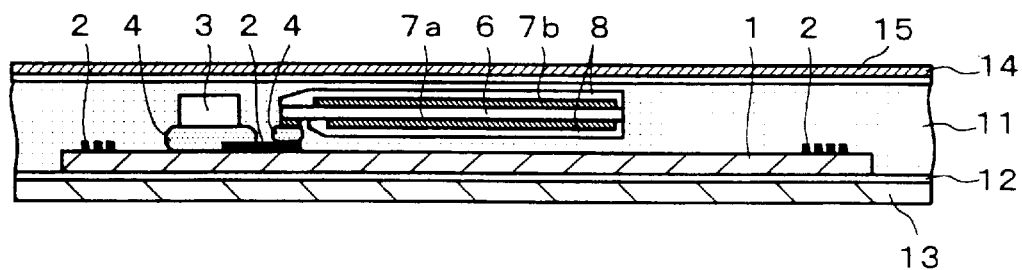
Figure 2A:
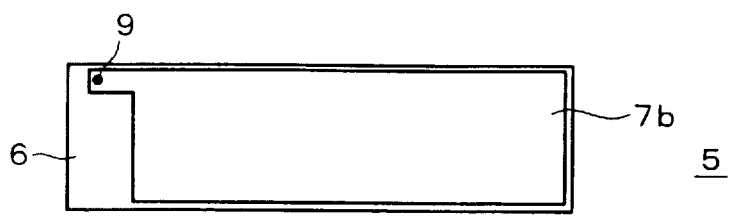
FIGS. 2A and 2B show a top view and a bottom view of a mica capacitor, respectively.
Figure 2B:
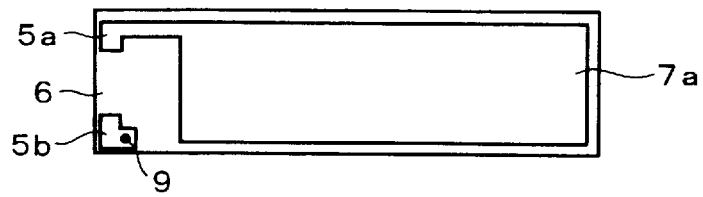

FIGS. 1A and 1B show a plane view and a cross-sectional view along x-x of an IC card 10A in accordance with the present invention, respectively, which is used by sticking it as a label with ID function to video films or other articles. In FIG. 1A, the area enclosed by the broken line shows a magnification of the vicinity of the terminals of a mica capacitor 5. The area filled with dots is connected by an anisotropic conductive adhesive 4. FIGS. 2A and 2B show a top view and a bottom view of the mica capacitor 5 used for this IC card 10A, respectively.

This IC card 10A includes an antenna coil 2, an IC chip 3, and a mica capacitor 5 mounted on an insulating substrate 1 made of an insulating film, such as PET or polyimide, which are sealed by a sealing resin 11 made of a thermosetting resin, such as an epoxy resin, or a hot-melting resin, such as polyester. Moreover, an outer film 13 made of polyester for example is laminated on the sealing resin 11 on the side of the insulating substrate 1, with a pressure-sensitive adhesive 12, made of an acrylic resin or the like, arranged between the sealing resin 11 and the outer film 13. A peelable paper 15 is laminated on the opposite side, with a pressure-sensitive adhesive 14 arranged between the sealing resin 11 and the peelable paper 15. When using the IC card 10A as a label, this peelable paper 15 can be peeled off, and the IC card 10A can be tacked on certain articles with the pressure-sensitive adhesive 14.

In this IC card 10A, the antenna coil 2 is formed by etching a copper foil laminated onto the insulating substrate 1. The IC chip 3 is mounted face down on the substrate 1 with the anisotropic conductive adhesive 4.

The mica capacitor 5 includes a mica film 6 and electrodes 7a and 7b formed on both sides of the mica film 6. In the drawings, a terminal 5b of the electrode 7b on the upper side of the mica film 6 is formed on the lower side of the mica film 6 by means of a through-hole 9, and brought together on the same side with the terminal 5a of the electrode 7a on the lower side of the mica film 6. Consequently, the terminals 5a and 5b of the mica capacitor 5 can be connected by the anisotropic conductive adhesive 4 with an inner terminal 2a and an outer terminal 2b of the antenna coil 2, respectively.

The mica capacitor 5 is manufactured, for example, as follows. First, a mica film 6 is prepared, which is provided with an aperture for the through-hole 9. Then, the electrode 7b (or the electrode 7a) is formed by silver paste printing on one side of the mica film 6. After that, the pattern for the electrode 7a (or the electrode 7b) and the terminal 5b of the electrode 7b is also formed by silver paste printing. Thus, the aperture for the through-hole 9 is filled with silver paste, and the through-hole 9 electrically connects the electrode 7b and its terminal 5b. Then, an insulating covering 8 of a glass coating or the like is formed on the side of the mica film 6, but leaving the terminals 5a and 5b open.

Figure 5:
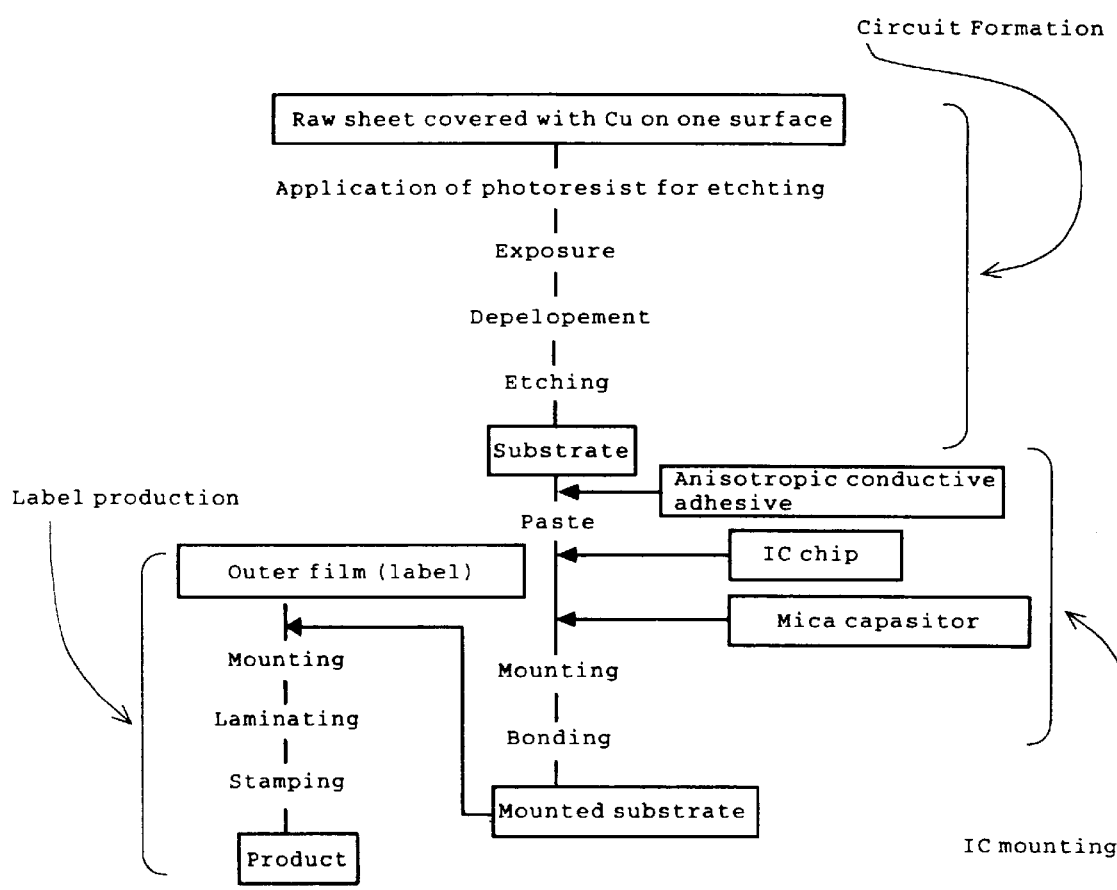
FIG. 5 is a diagram illustrating the manufacturing process of an IC card.

Using this mica film 5, the IC card 10A is manufactured with the steps illustrated in FIG. 5.

Figure 3A:
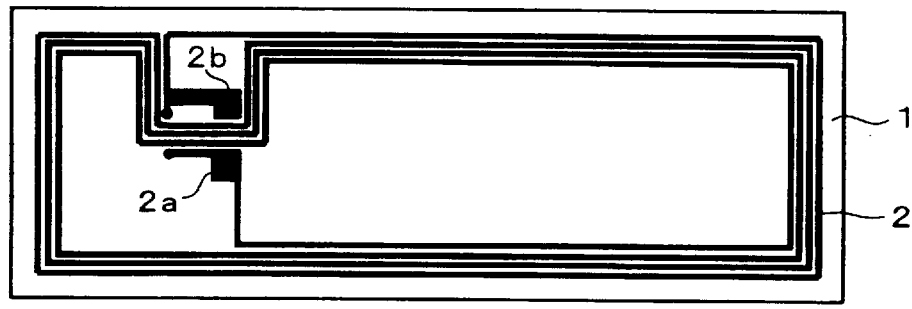
FIGS. 3A, 3B and 3C are a series of plane views showing the manufacturing steps for an IC card in accordance with the present invention, where
Figure 3B:
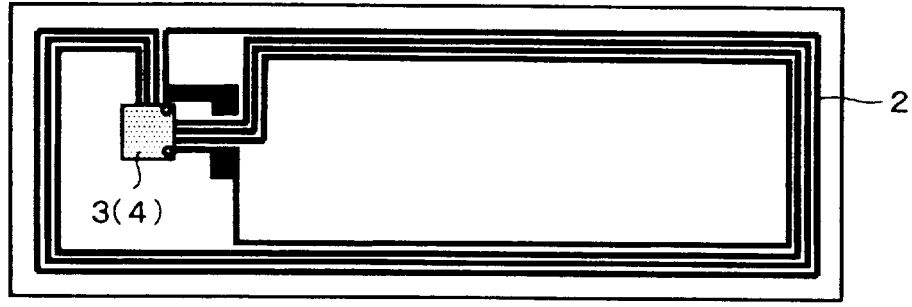
Figure 3C:
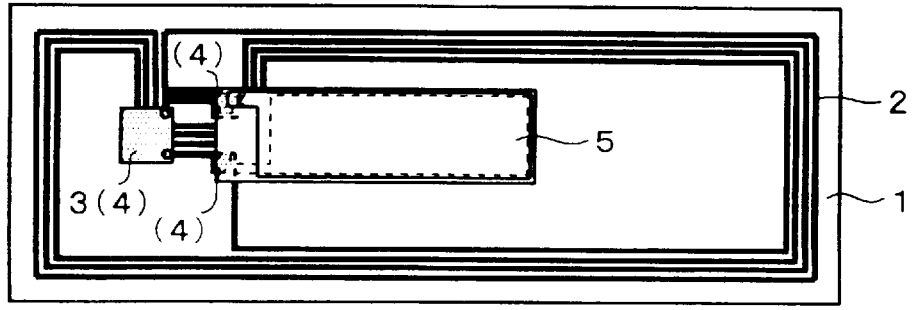

First of all, a laminated sheet (raw sheet covered with copper on one side) in which a conductive layer of, for example, copper foil is formed on one side of an insulating substrate 1 made of an insulating film, such as PET or polyimide, is prepared, then this conductive layer is coated with photoresist by one of the methods known in the art, and the antenna coil 2 and the accompanying circuit as shown in FIG. 3A are formed by exposing, developing and etching a predetermined pattern. Then, the IC chip 3 is mounted in a face-down fashion using the anisotropic conductive adhesive 4, as shown in FIG. 3B. Also the mica capacitor 5 is mounted using the anisotropic conductive adhesive 4. Then, the IC chip 3 and the mica capacitor 5 are bonded simultaneously. Thus, an antenna coil 2 is formed on the insulating substrate 1, as shown in FIG. 3C, and a mounting board on which the IC chip 3 and the mica capacitor 5 are mounted is obtained. Here, one of the anisotropic conductive adhesives 4 known in the art can be used, and the anisotropic conductive adhesive 4 can be in the form of either a film or a paste, for example.

Figure 4:
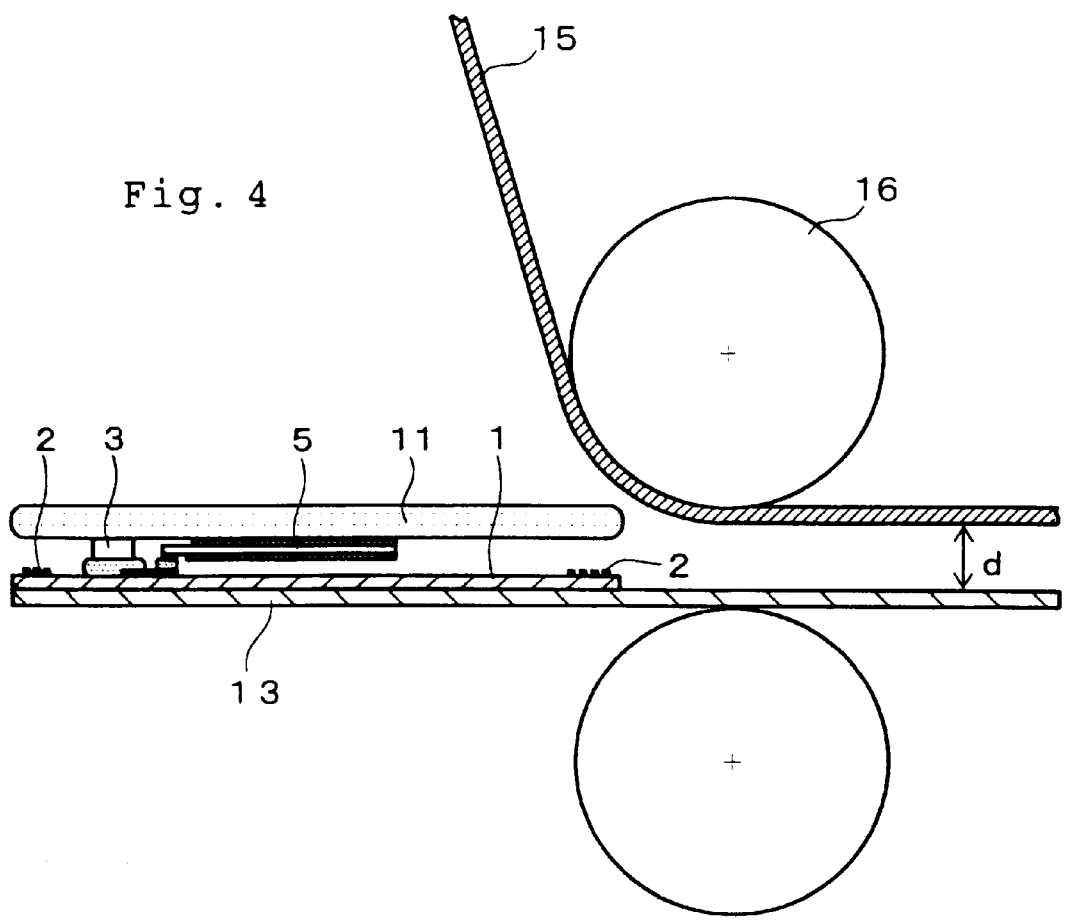
FIG. 4 illustrates the step of layering the peelable paper and the outer film in the manufacturing process for the IC card of the present invention.

Then, as shown in FIG. 4, the outer film (label) 13 is tacked to the mounting board on the side of the insulating substrate 1 with a pressure-sensitive adhesive (not shown in the drawing), a sealing resin 11 is applied to the other side, and a peelable paper 15 with pressure-sensitive adhesive is laid on top of the sealing resin 11 and laminated to it while applying heat and pressure with a roller 16. Thus, the spacing between the outer film 13 and the peelable paper 15 can be adjusted to a predetermined gap width d. Then, after a stamping step, an article like the IC card 10A as shown in FIGS. 1A and 1B is obtained.

The resulting IC card 10A uses the mica film 6 as the dielectric for the capacitor, so that there are no shifts in the resonant frequency due to absorbed moisture, and the antenna characteristics are improved. Moreover, the mica capacitor 5 is mounted with the anisotropic conductive adhesive 4, so that the costs for mounting the capacitor can be kept low, and the reliability of the adhesion is improved.

Figure 6A:
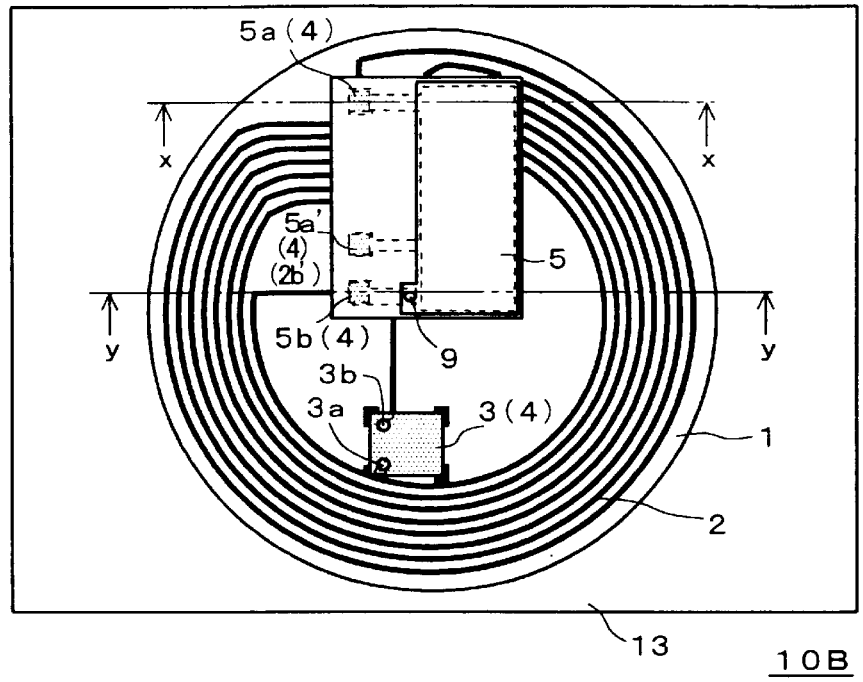
FIGS. 6A, 6B and 6C show a plane view, a cross-sectional view along x-x, and a cross-sectional view along y-y of an IC card in accordance with the present invention, respectively.
Figure 6B:
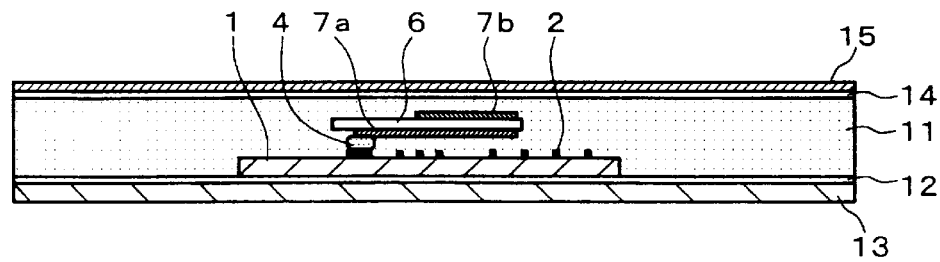
Figure 6C:
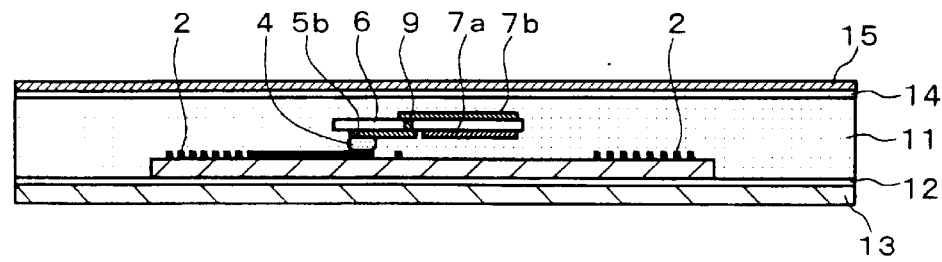
Figure 7:
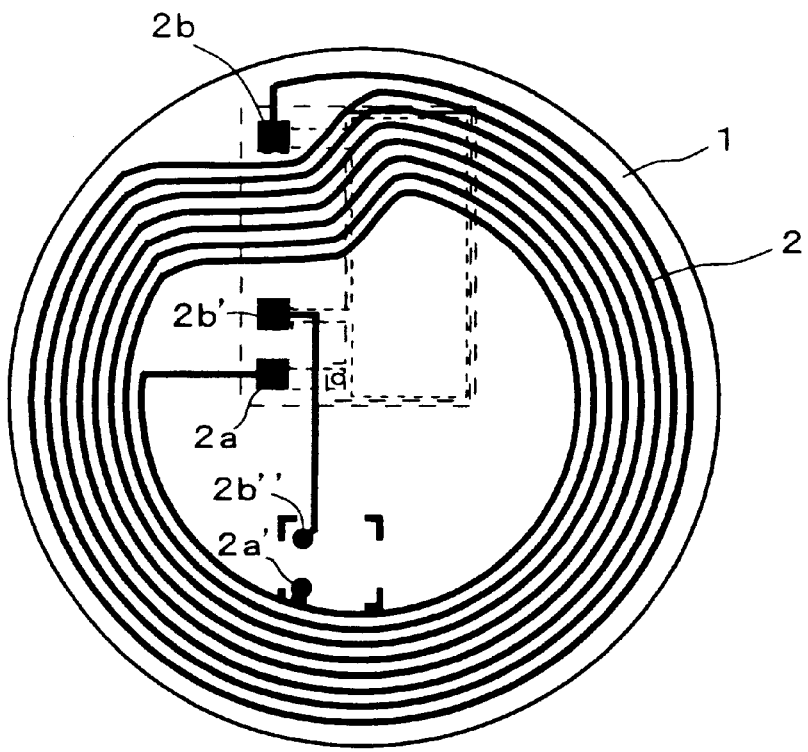
FIG. 7 is a plane view taken during the manufacturing process of the IC card of the present invention, after the antenna coil has been formed.
Figure 8A:
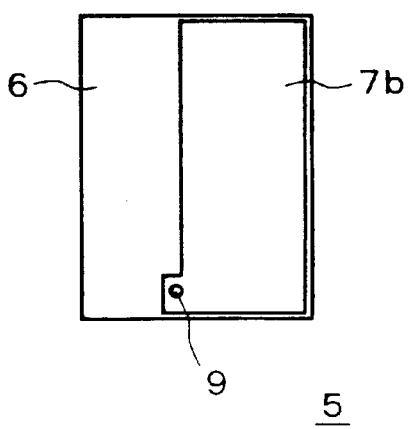
FIGS. 8A and 8B show a top view and a bottom view of the mica capacitor, respectively.
Figure 8B:
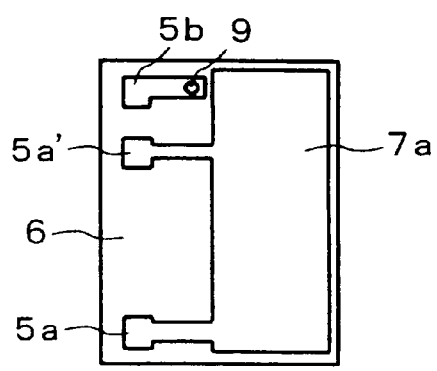

FIGS. 6A, 6B and 6C show a plane view, a cross-sectional view along x-x, and a cross-sectional view along y-y of an IC card 10B in another embodiment of the present invention, respectively. FIG. 7, which shows the IC card 10B before the IC chip 3 and the mica capacitor 5 are mounted, is a plane view of the antenna coil 2 formed on the insulating substrate 1. FIGS. 8A and 8B show a top view and a bottom view of the mica capacitor 5 used for this IC card 10B, respectively.

Whereas the antenna coil 2 in the above-described IC card 10A is substantially rectangular, the antenna coil 2 in this IC card 10B is substantially circular. Thus, there is no particular limitation with regard to the shape of the antenna coil 2 in the present invention.

Also in this IC card 10B, the terminals of the electrodes on both sides of the mica capacitor 5 are put together on one side of the mica film 6 by means of the through-hole 9, so that it becomes possible to mount the mica capacitor 5 on the insulating substrate 1 using the anisotropic conductive adhesive 4, but in this IC card 10B, the mica capacitor 5 is provided with an additional terminal 5a' (see FIG. 8B). That is to say, as the terminal of the mica capacitor 5 for connecting to the outer terminal 2b of the antenna coil 2, the terminal 5a is formed on the electrode 7a on the lower side of the mica film 6, but the electrode 7a also has a terminal 5a' on the inner side of the antenna coil 2. A terminal 2b' connected to the terminal 5a' is formed on the insulating substrate 1, and this terminal 2b' is connected with a wiring pattern to a terminal 2b", which is connected to a terminal 3b of the IC chip 3 (see FIG. 7). An insulating covering (not shown in the drawings) is formed on the side of this mica capacitor 5 as well, except for the terminal portions.

On the other hand, the inner terminal 2a of the antenna coil 2 is connected with the anisotropic conductive adhesive 4 to the terminal 5b of the electrode 7b on the upper side of the mica film 6, but the antenna coil 2 is also provided with an inner terminal 2a' for connection with the terminal 3a of the IC chip 3.

Consequently, in this IC card 10B, the outer terminal 2b and the inner terminal 2a of the antenna coil are respectively connected to the terminals 3b and 3a of the IC chip 3, so that it is not necessary to accommodate the entire winding width of the antenna coil 2 between the two terminals 3a and 3b of the IC chip. Thus, the design freedom of the antenna coil 2 for this IC card 10B can be increased.

Figure 9A:
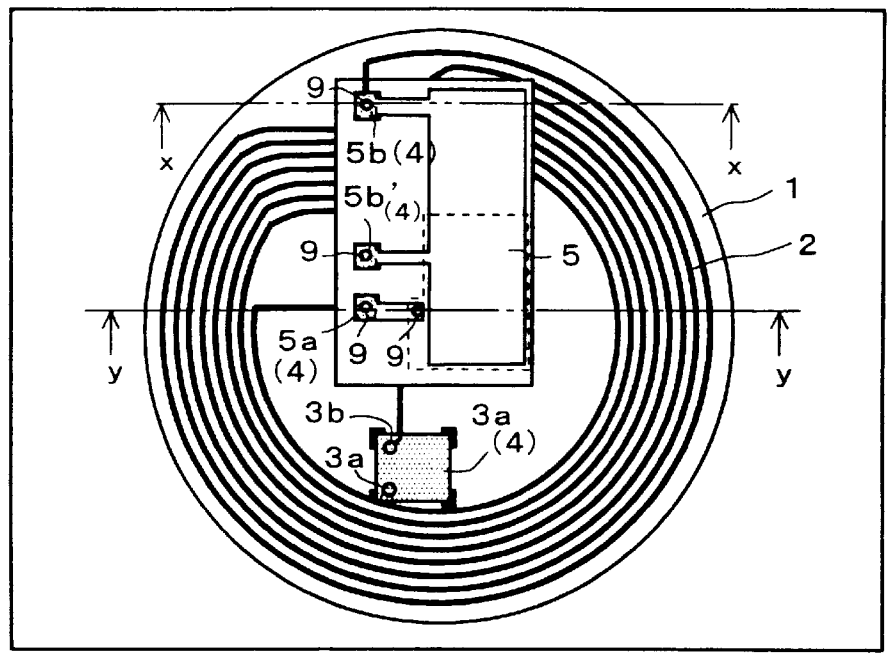
FIGS. 9A, 9B and 9C shos a plane view, a cross-sectional view along x-x, and a cross-sectional view along y-y of an IC card in accordance with the present invention, respectively.
Figure 9B:
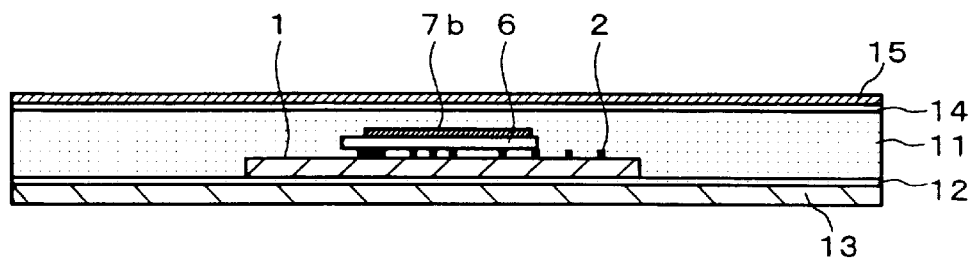
Figure 9C:
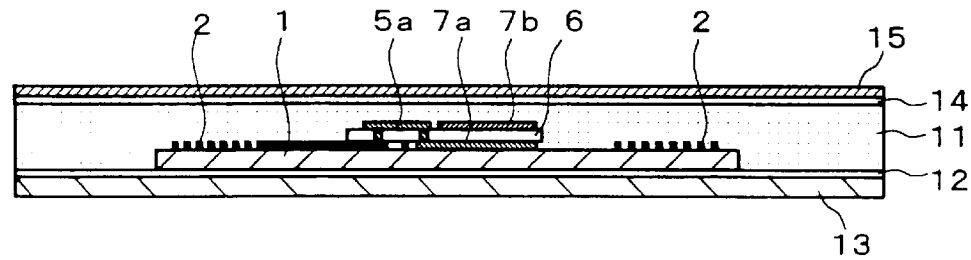
Figure 10:
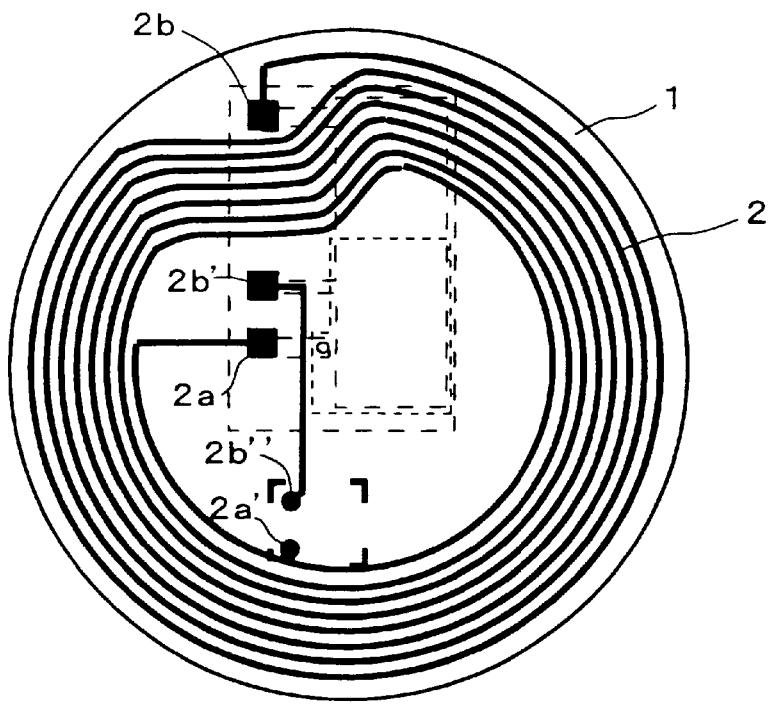
FIG. 10 is a plane view taken during the manufacturing process of the IC card of the present invention, after the antenna coil has been formed.
Figures 11A, 11B:
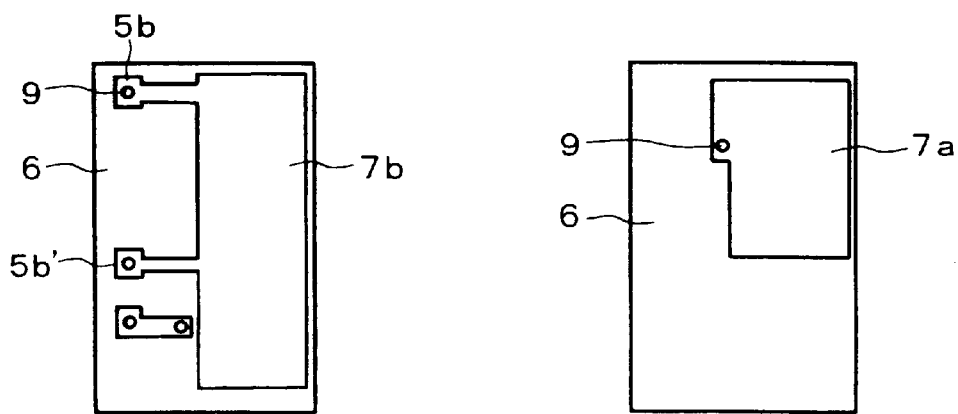
FIGS. 11A and 11B show a top view and a bottom view of the mica capacitor, respectively.

FIGS. 9A, 9B and 9C show a plane view, a cross-sectional view along x-x, and a cross-sectional view along y-y of yet another IC card 10C in accordance with the present invention, respectively. FIG. 10, which shows the IC card 10C before the IC chip 3 and the mica capacitor 5 are mounted, is a plane view of the antenna coil 2 formed on the insulating substrate 1. FIGS. 11A and 11B show a top view and a bottom view of the mica capacitor 5 used for this IC card 10C, respectively.

Like the above-described IC card 10B, this IC card 10C has a substantially circular antenna coil 2. Also in this IC card 10C, the terminals of the electrodes on both sides of the mica capacitor 5 are put together on one side of the mica film 6, and connected on the insulating substrate 1 using the anisotropic conductive adhesive 4.

Furthermore, in this IC card 10C, as the terminal of the mica capacitor 5 for connection to the outer terminal 2b of the antenna coil 2, the electrode 7b on the upper side of the mica film 6 is provided with a terminal 5b that is connected to the terminal 2b of the antenna coil by means of a through-hole 9, but the electrode 7b also has a terminal 5b' on the inner side of the antenna coil 2 (see FIG. 11A). Like in the above-mentioned IC card 10B, a terminal 2b', which is connected to the terminal 5b', is formed on the insulating substrate 1, and this terminal 2b' is connected with a wiring pattern to a terminal 2b'', which is connected to a terminal 3b of the IC chip 3 (see FIG. 10).

On the other hand, the inner terminal 2a of the antenna coil 2 is connected with the anisotropic conductive adhesive 4 to the terminal 5a, which is connected to the electrode 7a on the lower side of the mica film 6 by means of the through-hole 9. The antenna coil 2 is also provided with an inner terminal 2a' for connection with the terminal 3a of the IC chip 3.

Consequently, also in this IC card 10C, it is not necessary to accommodate the entire winding width of the antenna coil 2 between the two terminals 3a and 3b of the IC chip 3, and the design freedom of the antenna coil 2 can be increased.

Furthermore, in this IC card 10C, the electrode 7a on the lower side of the mica film 6 is formed at a position where it does not overlap with the antenna coil 2. That is to say, the region where the mica capacitor 5 overlaps with the antenna coil 2 is a region in which only one side is provided with an electrode (single-sided electrode region), and this region is made only of the mica film 6 and the electrode 7b on the upper side. This single-sided electrode region intersects with the antenna coil 2 with the mica film 6 arranged on the side of the antenna coil 2. With this IC card 10C, the insulation between the antenna coil 2 and the electrodes of the mica capacitor 5 can be ensured even when the mica film 6 overlaps directly with the antenna coil 2. Consequently, it is possible to reduce the thickness of the mounting board on which the mica capacitor 5 is mounted.

Figure 12:
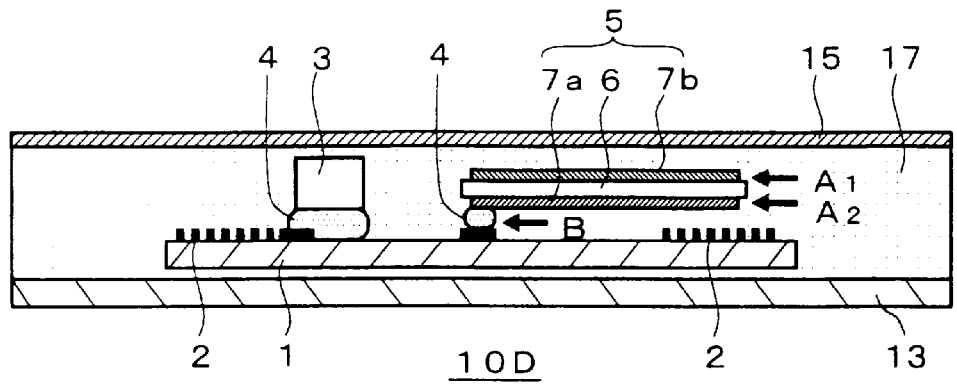
FIG. 12 is a cross-sectional view of an IC card in accordance with the present invention.

FIG. 12 is a cross-sectional view of an IC card 10D in yet another embodiment of the present invention. In this IC card 10D, just like in the mounting board used for the IC card 10B shown in FIGS. 6A, 6B and 6C, the antenna coil 2 is formed on the insulating substrate 1 of the mounting board, and the IC chip 3 and the mica capacitor 5 are mounted on the mounting board, but instead of the sealing resin 11 and the pressure-sensitive adhesive 12 and 14 of the IC card 10B in FIGS. 6A, 6B and 6C, a pressure-sensitive adhesive 17 is used that also serves as a filler, and the peelable paper 15 is provided on its surface. Consequently, the thickness of this IC card 10D can be reduced to about half the thickness of the IC card 10B in FIGS. 6A, 6B and 6C.

In order to prevent fraudulent reuse of the IC card, in which the IC card is peeled off after it has been adhered to a certain article and then attached to a different article, it is preferable that fraudulently peeling off the IC card once it has been tacked to a certain article destroys the IC card.

Figure 13A:
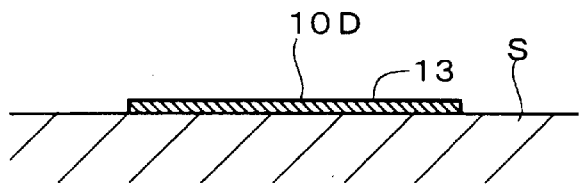
FIG. 13A shows a cross-sectional view of an IC card of the present invention.
Figure 13B:
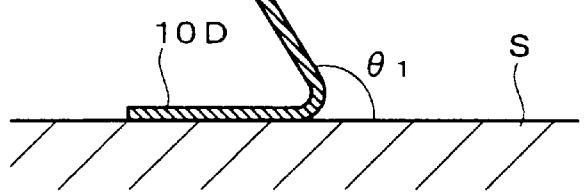
FIGS. 13B and 13C illustrate how this IC card and a conventional IC card are peeled off after having been attached to an article.
Figure 13C:
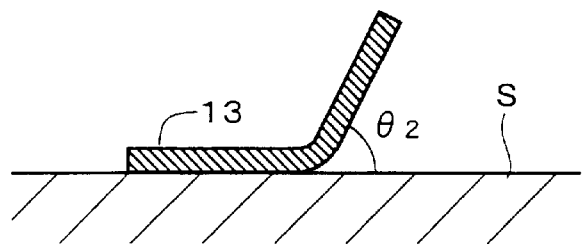

When the card is made thinner like the IC card 10D in FIG. 12, the peeling angle $è_1$, that is made when the IC card 10D is peeled off as shown in FIG. 13B after it has been tacked to a certain article S as shown in FIG. 13A, is larger than the peeling angle $è_2$ that is made when the IC card is thick (FIG. 13C). Consequently, when this IC card 10D is peeled off the article, a large load is applied on the mounting plate inside the IC card, so that the mounting plate breaks easily. Thus, it is possible to prevent fraudulent reuse.

With regard to preventing fraudulent reuse of the IC card, it is preferable to select a pressure-sensitive adhesive material 17 that has greater adhesion to the article S than to the mica capacitor 5. If the article S to which the IC card 10D is tacked is an ABS resin, then examples of suitable pressure-sensitive adhesive materials 17 include UV-curing resin pressure-sensitive adhesives (such as G9000 by Sony Chemicals, Corp.) and acrylic pressure-sensitive adhesives (such as T4000 and NP203 by Sony Chemicals, Corp.).

Thus, if the mica capacitor 5, the antenna coil 2 and the IC chip 3 on the insulating substrate 1 are covered by a jacket material formed on the pressure-sensitive adhesive material 17, and if the pressure-sensitive adhesive material 17 is provided directly at least on the mica capacitor 5 without a sealing resin interposed between the two, and the thickness of the IC card 10D is reduced or the adhesion of the pressure-sensitive adhesive material 17 to the article S is increased, then once the IC card 10D has been tacked to the article S, the mica capacitor 5 is destroyed easily at the border between the electrodes 7a or 7b of the mica capacitor 5 and the mica film 6 when trying to peel the IC card 10D off the article S, as indicated by the arrows A1 and A2 in FIG. 12, and destruction of the mica capacitor 5 or the resonance circuit also tends to occur from the position where the mica capacitor 5 is connected to the insulating substrate 1 with the anisotropic conductive adhesive 4, as indicated by the arrow B.

Figure 14:
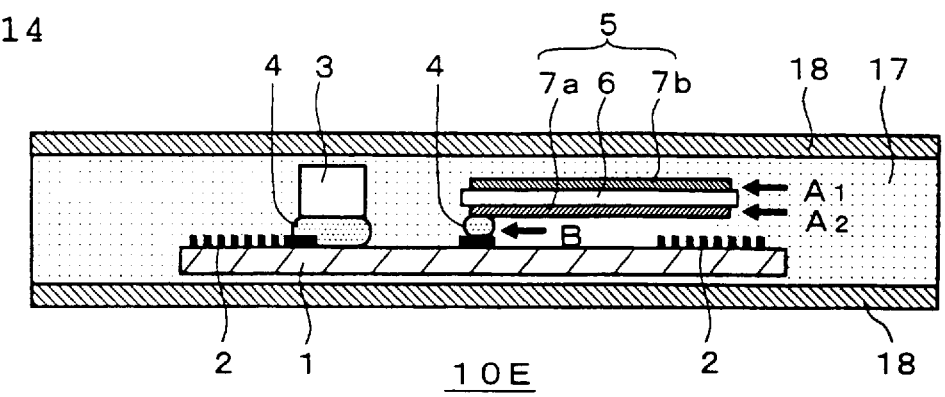
FIG. 14 is a cross-sectional view of an IC card in accordance with the present invention.

The IC card 10E in FIG. 14 is provided with a jacket film 18 as a jacket material replacing the outer film 13 and the peelable paper 15 of the IC card 10D in FIG. 12. Whereas the above-described IC cards 10A, 10B, 10C and 10D are tacked to an article by peeling off the peelable paper 15, this IC card 10E is not tacked to an article but used as an individual card. Thus, it is preferable that also in this IC card 10E used as an individual card, the pressure-sensitive adhesive 17 is provided directly at least on the mica capacitor 5 without a sealing resin interposed between the two, so as to prevent the fraudulent use and tampering of data stored on the IC card 10E.

The IC card of the present invention is not limited to the above-described IC cards 10A, 10B, 10C, 10D and 10E, and many variations are possible. Consequently, it is not always necessary to use the outer film 13 or the peelable paper 15 with pressure-sensitive adhesive as the jacket material. Moreover, the shape and the position of the electrodes of the mica capacitor 5 and their terminals can be selected as appropriate.

EXAMPLE

The following example describes the present invention more specifically.

Example 1

Figure 15:
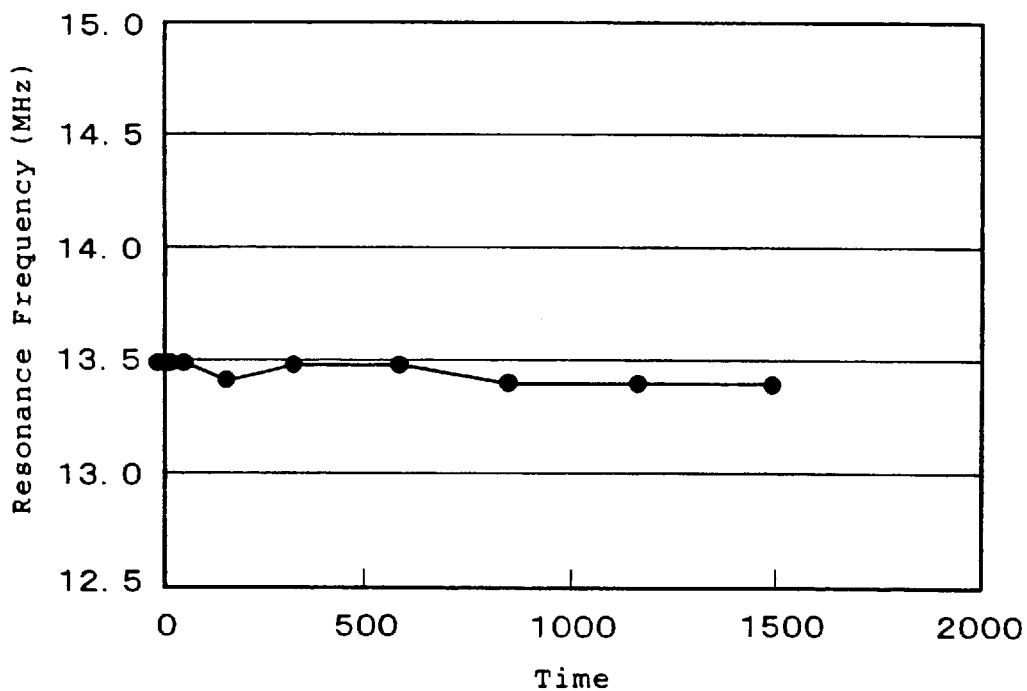
FIG. 15 is a graph showing the resonance frequency as a function of time when an IC card of Example 1 is subjected to an endurance test at 60° C. and 90% humidity.
Figure 16:
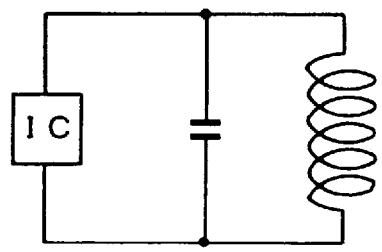
FIG. 16 is a diagram illustrating the basic circuit elements in an IC card.

An IC card as shown in FIG. 1 was manufactured according to the following specifications:

insulating substrate: PET film (50 μm thickness)
raw material for antenna coil: copper of 35 μm film thickness
inductance of antenna coil: 0.92 μH
resistance of antenna coil: 0.6Ω
length of antenna coil: 418 mm
number of antenna coil windings: 4 turns
dielectric constant of mica film: $\in$=7.1
capacitance of mica capacitor: 150 pF
IC chip: contactless IC (13.56 MHz)
outer film: polypropylene film Evaluation To evaluate the reliability of the IC card of Example 1, the IC card was subjected to an endurance test at 60° C. and 90% humidity, and shifts in the resonance frequency were determined. The results are shown in FIG. 15.

The resonance frequency shifts in this Example 1 were suppressed to about 1/3 of those in a conventional IC card using a polyimide film as the insulating substrate.

INDUSTRIAL APPLICABILITY

With the IC card of the present invention, the resonance frequency can be stabilized, because it uses a mica capacitor. Furthermore, the manufacturing costs can be lowered and the reliability of the connection can be improved, because the electrode terminals are put together on one side of the mica capacitor, and the mica capacitor can be mounted with an anisotropic conductive adhesive.

What is claimed is:

1. An IC card comprising a mica capacitor having a single-sided electrode region formed on a portion of the mica capacitor, an antenna coil and an IC chip formed on a substrate, the mica capacitor comprising a mica film and electrodes formed on both sides of the mica film, wherein a terminal of an electrode on one side of the mica capacitor is formed on the other side of the mica capacitor, and the terminal of the electrode on the one side and a terminal of the electrode on the other side are wirelessly connected on the substrate by an anisotropic conductive adhesive, and wherein the single-sided electrode region comprises one of the electrodes and the mica film.

2. The IC card according to claim 1, wherein the terminal of the electrode on one side of the mica capacitor is formed on the other side of the mica capacitor by means of a through-hole.

3. The IC card according to claim 2, wherein, in case where one terminal of one electrode of the mica capacitor is connected to an outer terminal of the antenna coil, said electrode also has another terminal on an inner side of the antenna coil. substrate by an anisotropic conductive adhesive, and wherein the single-sided electrode region comprises one of the electrodes and the mica film.

4. The IC card according to claim 2, wherein the single-sided electrode region intersects with the antenna coil with the mica film arranged on a side of the antenna coil.

5. The IC card according to claim 2, wherein the mica capacitor, the antenna coil and the IC chip on the substrate are covered by a jacket material with an pressure-sensitive adhesive material interposed therebetween, and wherein at least on the mica capacitor, the pressure-sensitive adhesive material is provided without an interposed sealing resin.

6. The IC card according to claim 1, wherein, in case where one terminal of one electrode of the mica capacitor is connected to an outer terminal of the antenna coil, said electrode also has another terminal on an inner side of the antenna coil.

7. The IC card according to claim 6, wherein the single-sided electrode region intersects with the antenna coil with the mica film arranged on a side of the antenna coil.

8. The IC card according to claim 6, wherein the mica capacitor, the antenna coil and the IC chip on the substrate are covered by a jacket material with an pressure-sensitive adhesive material interposed therebetween, and wherein at least on the mica capacitor, the pressure-sensitive adhesive material is provided without an interposed sealing resin.

9. The IC card according to claim 1, wherein the mica capacitor, the antenna coil and the IC chip on the substrate are covered by a jacket material with an pressure-sensitive adhesive material interposed therebetween, and wherein at least on the mica capacitor, the pressure-sensitive adhesive material is provided without an interposed sealing resin.

10. The IC card according to claim 1, wherein the single-sided electrode region intersects with the antenna coil with the mica film arranged on a side of the antenna coil.

11. The IC card according to claim 10, wherein the mica capacitor, the antenna coil and the IC chip on the substrate are covered by a jacket material with an pressure-sensitive adhesive material interposed therebetween, and wherein at least on the mica capacitor, the pressure-sensitive adhesive material is provided without an interposed sealing resin.

12. A mica capacitor for an IC card having a substrate, the mica capacitor having a single-sided electrode region formed on a portion of the mica capacitor, the mica capacitor comprising a mica film and electrodes formed on both sides of the mica film, wherein a terminal of an electrode on one side of the mica capacitor is formed on the other side of the mica capacitor, and the terminal of the electrode on the one side and a terminal of the electrode on the other side are wirelessly connected on the substrate by an anisotropic conductive adhesive, and wherein the single-sided electrode region comprises one of the electrodes and the mica film.

* * * * *